United States Patent [19]

Lucia

[11] 4,319,454
[45] Mar. 16, 1982

[54] WAVE ACTION POWER PLANT

[76] Inventor: Louis V. Lucia, 5200 N. Ocean Blvd., Apt. 1110, Fort Lauderdale, Fla. 33308

[21] Appl. No.: 82,681

[22] Filed: Oct. 9, 1979

[51] Int. Cl.³ .............................................. F03B 13/12
[52] U.S. Cl. ...................................... 60/506; 60/500; 60/505; 417/332
[58] Field of Search ................. 60/495, 497, 505, 506, 60/507, 500, 501; 290/42, 53; 417/330-333

[56] References Cited

U.S. PATENT DOCUMENTS

| | | | |
|---|---|---|---|
| 1,033,476 | 7/1912 | Schulze | 60/501 |
| 1,443,626 | 1/1923 | Hinckley | 60/500 |
| 3,894,241 | 7/1975 | Kaplan | 290/53 |
| 3,965,365 | 6/1976 | Parr | 60/507 X |
| 3,974,652 | 8/1976 | Lovmark | 60/506 X |

FOREIGN PATENT DOCUMENTS 2282544  3/1976  France .................................. 60/497

*Primary Examiner*—Allen M. Ostrager
*Assistant Examiner*—Stephen F. Husar

[57] ABSTRACT

A wave action power plant powered by the action of water waves has a drive shaft rotated by a plurality of drive units, each having a lever pivotally mounted on and extending from said shaft and carrying a weight, in the form of a float, which floats on the waves and rocks the lever up and down on the shaft. A ratchet mechanism causes said shaft to be rotated in one direction by the weight of said float after it has been raised by wave and the wave has passed, leaving said float free to move downwardly by gravity and apply its full weight to pull down on the lever and rotate the drive shaft. There being a large number of said drive units so that there are always some of the weights pulling down on their respective levers while other weights are being lifted by waves and thereby causing continuous rotation of the drive shaft in one direction. The said levers are so mounted that they may be easily raised to bring the weights into a position wherein they are readily accessible for cleaning the bottoms thereof to remove any accumulation of barnacles, mollusks and the like. There is also provided means for preventing the weights from colliding with each other as they independently move up and down on the waves.

3 Claims, 4 Drawing Figures

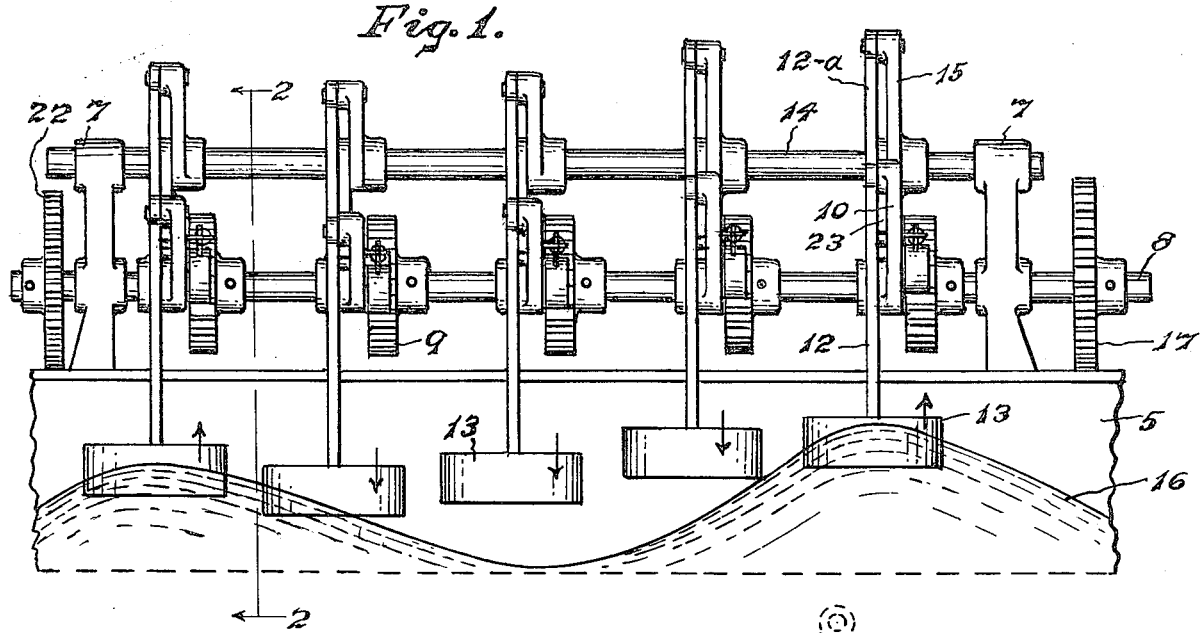
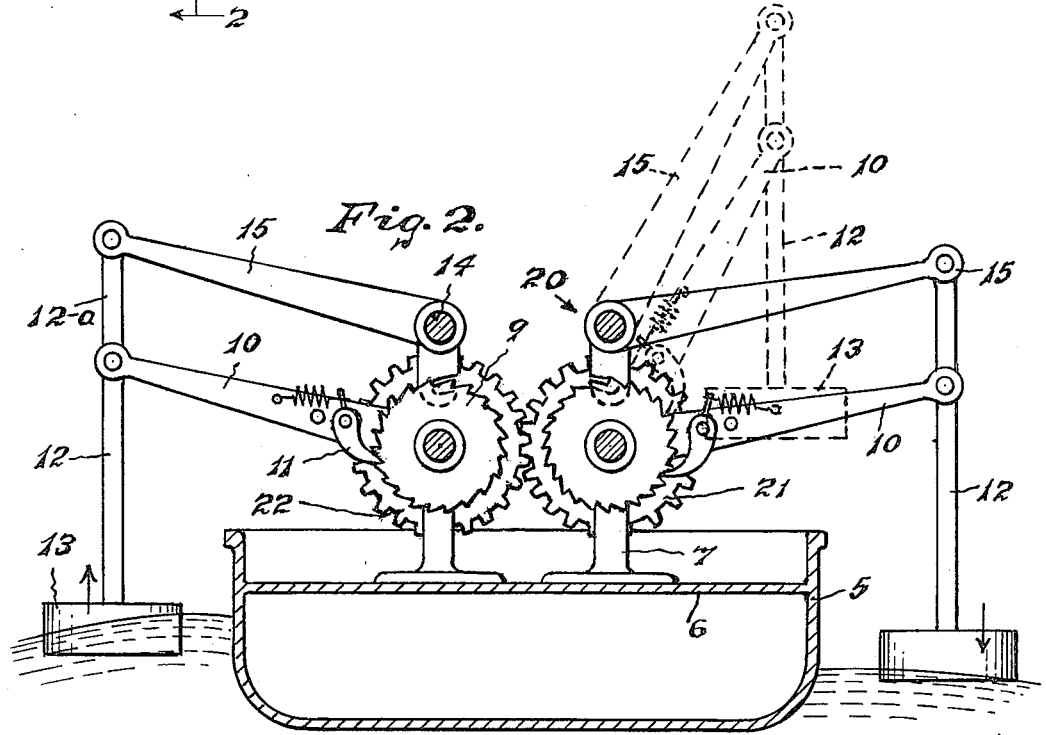
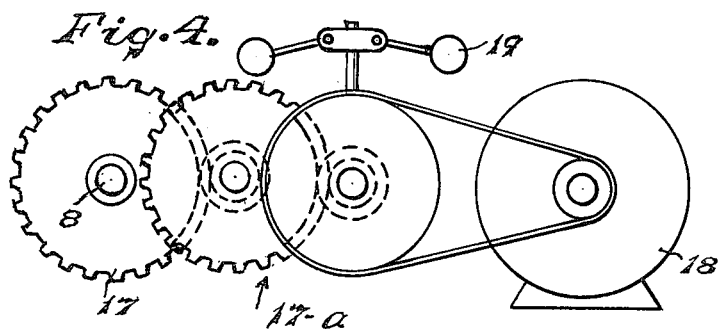
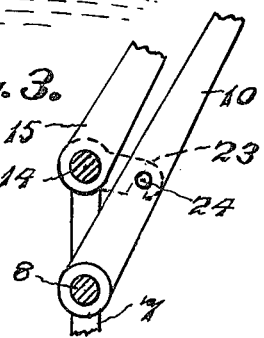

WAVE ACTION POWER PLANT

BACKGROUND OF THE INVENTION

At this time of an energy crisis, it is being widely recognized that an unlimited amount of free energy can be obtained by utilizing the power in the up and down motion of the sea waves. Various devices and methods are known for utilizing said power but they have been hampered by difficulties due to problems with such as excessive turbulence in the waves during rough seas and accumulation of barnacles and mollusks on the wave actuated elements of the power plant, which accumulations have been very difficult to remove.

This invention provides a simple and highly efficient wave power plant which eliminates the said problems and which is highly efficient and economical to produce. The said power plant being contained entirely on a carrier which floats on the surface of the water and thereby eliminates the need for costly construction as where known power plants are mounted on bases resting on the bottom of the sea. Also, my improved power plant can be built on land and floated to a chosen location, thereby making it more economical to construct.

BRIEF DESCRIPTION OF THE DRAWING

FIG. 1 is a side view of a wave action power plant embodying the present invention.

FIG. 2 is an end view on line 2—2 of FIG. 1.

FIG. 3 is an end view illustrating in detail a feature in the mechanism of said invention.

FIG. 4 is a diagrammatical view of a gear train that may be connected to said power plant for driving a conventional electric generator.

DESCRIPTION OF THE PREFERRED EMBODIMENT

As shown in FIG. 1 of the accompanying drawing, 5 denotes a floatable carrier vessel, such as a ship or barge, which may be anchored at any chosen location and has a deck 6 on which is mounted all of the mechanism of my improved power plant which includes supports 7—7 that are secured to the said deck 6. A drive shaft 8 is rotatably mounted in said supports and carries a number of identical power units for driving said shaft by the action of the waves passing by along the side of the carrier 5. Each of said power units includes a driving member such as a ratchet wheel 9 secured to said shaft 8 and a driving lever 10, rotatable on said shaft and extending therefrom over the side of the carrier 5; a pawl 11 being provided for rotating the ratchet wheel 9 clockwise by rocking movement of the lever 10 on the shaft 8.

At the free end of said lever 10 there is pivotally mounted a vertical bar 12 carrying at its lower end a buoyant weight 13 which normally floats on the surface of the waves as they pass along the side of the vessel 5.

In order to steady the weight 13 in its up and down movement by the passing waves, especially in rough seas, and prevent said weight from colliding with the weights of the adjacent power units and the side of the carrier 5, there is provided a separate shaft 14 mounted on the supports 7—7, directly above the drive shaft 8 and each power unit has a steadying lever 15 rotatable on said separate shaft 14 and extending over and parallel with the lever 10.

The said bar 12 has a vertical extension 12-a with the upper end thereof pivotally secured to the free end of lever 15.

In the operation of said power plant, the weights 13 will float on the passing waves 16 and each of said weights will be lifted vertically as a wave passes by. As a weight is lifted, it will raise its respective lever 10 and cause its pawl 11 to move up and get a new bite on the teeth of the ratchet wheel 9. Then, as the wave passes by, the full load from said weight will be left hanging on said lever 10 to pull it downwardly and help rotate the drive shaft 8, while some of the other weights 13 are being lifted by the wave, as it passes on, so that there is constantly a number of weights hanging on their levers and thereby providing the power to cause uninterrupted rotation of the drive shaft 8; all as illustrated by the arrows in FIG. 1 of the drawing.

As shown in FIG. 4, the drive shaft 8 has a gear 17 for driving a suitable gear train 17-a to increase the speed of rotation and drive an electric generator 18. If needed, a suitable speed governor 19 of a conventional type may be provided in said gear train to govern the speed of rotation.

As shown in FIG. 2, the above described mechanism may be duplicated on the opposite side of the carrier 5 with a similar assembly 20 which includes a driving gear 21 meshing with a gear 22 on the shaft 8 to assist in driving said shaft.

This duplication of the power mechanism will provide for doubling the number of power units on the carrier 5 for driving the shaft 8 and at the same time balancing the weight carried by said carrier so it will not tip to one side under the weight of all the weights hanging on their levers.

As shown in FIG. 2, the levers 10 and 15 of the power units may be swung upwardly to carry the weights 13 out of the water, to the position shown in dotted lines, when it is required to idle the power plant, to move it to a different location, or to clean the bottoms of the weights. When in said dotted position the levers 10 and 15 may be hooked together, as shown in FIG. 3, by a hook 23 which is pivoted on the shaft 14 and engageable with a stud 24 on the lever 10 to hold the said levers and the weight 13 in the raised position illustrated. When in said position, the weight will be easily accessible from the deck 6 of the carrier 5 for removing any barnacles or mollusks that may have accumulated thereon.

I claim:

1. A wave action power plant mounted on a floatable carrier and comprising a rotatable drive shaft, a drive lever pivoted on said shaft and extending therefrom over the side of said carrier, a floatable weight depending from the free end of said lever and actuated by passing waves to rock said lever, means on said shaft actuated by rocking movement of said lever to drive said shaft, said lever being swingable to locate said weight in a raised position with its bottom accessible from aboard said carrier, and releasable means for retaining said weight in said raised position.

2. A wave actuated power plant mounted on a deck of a floatable carrier and comprising a rotatable drive shaft, a drive lever pivoted on said shaft and extending therefrom over the side of said carrier, driving means operable by rocking movement of said lever to rotate the shaft in one direction, and a floatable weight floatable upon waves passing along the side of said carrier; said weight having a vertical bar pivotally secured to the free end of the driving lever to rock the same upon the weight being lifted by a passing wave, and a steadying lever pivoted at a point spaced from the pivotal point of the driving lever on said shaft and having its free end pivotally secured to the said bar at a point spaced from the pivotal point of the driving lever on said bar whereby vertical movement of the weight will raise said levers in parallel and said steadying lever will resist lateral movement of said weight as it is raised and lowered under the action of the waves, and a hook engageable with one of said levers, when in raised position, to retain said weight in raised position with its bottom accessible from the deck of said carrier.

3. A water wave actuated power plant mounted upon a floating carrier and comprising a rotatable drive shaft journalled on said carrier and means extending from said drive shaft over the side of said carrier and actuated by passing waves for driving said shaft; said driving means including a plurality of floatable weights lifted by said waves, and mechanisms on said shaft actuated by the combined weight of a number of said floatable weights after they have been lifted by a passing wave and operable to cause uninterrupted rotation of said drive shaft; said mechanisms comprising a plurality of units each including a drive lever pivotally mounted on said drive shaft and extending therefrom over the side of said carrier and having one of said floatable weights connected thereto and floating on the waves adjacent the side of said carrier; said weight having a vertical bar extending therefrom and pivotally secured to the free end of the lever on the drive shaft and a vertical extension on said bar projecting above said lever, a separate shaft above and spaced from the drive shaft parallel thereto, a steadying lever rotatable on said separate shaft and having its free end pivotally secured to the top end of said extension whereby vertical movement of said weight will raise said drive and steadying levers in parallel and said steadying lever will restrict lateral movement of said weight as it is raised and lowered by the action of the waves thereon, a hook rotatable on said separate shaft, and means on said lever on the drive shaft engageable by said hook for retaining said levers and said weight in raised position with said weight spaced above the waves.

* * * * *